US010739471B2

(12) United States Patent
Laurichesse

(10) Patent No.: US 10,739,471 B2
(45) Date of Patent: Aug. 11, 2020

(54) GNSS RECEIVER WITH A CAPABILITY TO RESOLVE AMBIGUITIES USING AN UNCOMBINED FORMULATION

(71) Applicant: CENTRE NATIONAL D'ETUDES SPATIALES, Paris (FR)

(72) Inventor: Denis Laurichesse, Tournefeuille (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 278 days.

(21) Appl. No.: 15/738,926

(22) PCT Filed: Jun. 22, 2016

(86) PCT No.: PCT/EP2016/064339
§ 371 (c)(1),
(2) Date: Dec. 21, 2017

(87) PCT Pub. No.: WO2016/207176
PCT Pub. Date: Dec. 29, 2016

(65) Prior Publication Data
US 2020/0041658 A1 Feb. 6, 2020

(30) Foreign Application Priority Data
Jun. 24, 2015 (EP) .................................... 15305984

(51) Int. Cl.
*G01S 19/44* (2010.01)
*G01S 19/02* (2010.01)
(Continued)

(52) U.S. Cl.
CPC .............. *G01S 19/44* (2013.01); *G01S 19/02* (2013.01); *G01S 19/254* (2013.01);
(Continued)

(58) Field of Classification Search
CPC ........ G01S 19/44; G01S 19/02; G01S 19/254; G01S 19/258; G01S 19/29; G01S 19/32; G01S 19/43; G01S 19/04; G01S 19/36
(Continued)

(56) References Cited

U.S. PATENT DOCUMENTS

| 3,395,645 A | 8/1968 | Vilet |
| 9,157,999 B2 * | 10/2015 | Leandro .................. G01S 19/44 |

(Continued)

FOREIGN PATENT DOCUMENTS

| EP | 2140285 B1 | 7/2011 |
| FR | 1456862 | 10/1966 |

OTHER PUBLICATIONS

Laurichesse Denis, Mercier Flavien, Berthias Jean-Paul, Broca Patrick, Cerri Luca: "Integer Ambiguity Resolution on undifferenced GPS Phase measurements and its application to PPP and satellite precise orbit determination", Journal of Navigation vol. 56; No. 2, 2009.

(Continued)

*Primary Examiner* — Harry K Liu
(74) *Attorney, Agent, or Firm* — Burris Law, PLLC

(57) ABSTRACT

The invention discloses a receiver and a method to process navigation signals from one or more GNSS constellation, wherein an observation model and a measurement model allow a direct calculation of the carrier phase ambiguities. More specifically, in a triple frequency implementation, the receiver calculates in turn the extrawidelane, widelane and narrowlane ambiguities. The code and carrier phase biases can also be directly calculated. Thanks to the invention a quicker acquisition and tracking of a precise position, which will also be less noisy than a prior art solution, especially in some embodiments of the invention using a RAIM and/or a gap-bridging function. Also, code smoothing using the Dop-
(Continued)

pler and low latency clock synchronization allow to decrease the noise levels of the precise point navigation solutions.

14 Claims, 13 Drawing Sheets

(51) Int. Cl.
G01S 19/25 (2010.01)
G01S 19/29 (2010.01)
G01S 19/32 (2010.01)
(52) U.S. Cl.
CPC ............ G01S 19/258 (2013.01); G01S 19/29 (2013.01); G01S 19/32 (2013.01)
(58) Field of Classification Search
USPC .................................................. 342/357.27
See application file for complete search history.

(56) References Cited

U.S. PATENT DOCUMENTS

| | | | |
|---|---|---|---|
| 2010/0085252 A1 | 4/2010 | Laurichesse et al. | |
| 2011/0181463 A1 | 7/2011 | Chopard | |
| 2011/0187590 A1* | 8/2011 | Leandro .................. | G01S 19/40 342/357.27 |
| 2011/0210888 A1 | 9/2011 | Mercier | |
| 2011/0267228 A1* | 11/2011 | Talbot ...................... | G01S 19/07 342/357.27 |
| 2012/0286991 A1* | 11/2012 | Chen ........................ | G01S 19/04 342/357.23 |
| 2014/0002299 A1* | 1/2014 | Leandro .................. | G01S 19/11 342/357.27 |
| 2014/0070992 A1 | 3/2014 | Hernandez-Pajares | |

OTHER PUBLICATIONS

D. Laurichesse, White Paper, "Phase biases for ambiguity resolution: from an undifferenced to an uncombined formulation". published Sep 28, 2014.

Laurichesse: "based on RTCM Paper 055-2010-SC104-582" Paper 055-2010-SC104-582'ssr sv_orbit_clock_biases_4pm_SC104_v04; 2010.

G.J. Bierman, "Measurement Updating Using the U-D Factorization", Automatica, vol. 12, Issue 4, Jul. 1976, pp. 375-382.

C.L. Thornton,, G.J. Bierman, "Gram-Schmidt Algorithms for Covariance Propagation", International Journal of Control, vol. 25, Issue 2, 1977.

Petit et al. "D E H A N T T I D E I N E L", reference dehanttideinel.f, V. Dehant, IERS Conventions (2010).

Wu.J.T, Hajj G.A., Bertiguer W.I, Lichten S.M, "Effects of antenna orientation on GPS carrier phase" Jan. 1, 1993, Édit. 1, Manuscripta Geodaetica.

Peter Teunissen, Peter Joosten and Christian Tiberius, "A Comparison of TCAR, CIR and LAMBDA GNSS Ambiguity Resolution", proceedings of ION GPS 2002, Portland, Oregon.

International Search Report and Written Opinion for PCT/EP2016/064339, dated Sep. 28, 2016.

Chiu Davids et al: "Bierman-Thornton UD Filtering for Double-Differenced Carrier Phase Estimation Accounting or Full Mathematical Correlation", NTM 2008—Proceedings of the 2008, National Technical Meeting of the Institute of Navigation, The Institute of Navigation, 8551 Rixlew Lane Suite 360 Manassas, VA 20109, USA, Jan. 30, 2008 (Jan. 30, 2008), p. 756-762.

Hwang et al: "Kinematic GPS for Differential Positioning: Resolving Integer Ambiguities on the Fly", Navigation. Institute of Navigation, Fairfax, VA, US, vol. 38. No. 1, Jun. 1, 1991 (Jun. 1, 1991) pp. 1-16.

* cited by examiner

| Parameter | Unit | Quantity | Typical initial covariance | Typical model noise (1 s) |
|---|---|---|---|---|
| Position | m | 3 | 50 m | 10 m |
| Clock P1 GPS | m | 1 | inf | inf |
| Bias P2 GPS | m | 1 | 0 | 1 mm |
| Bias C5 GPS | m | 1 | 0 | 1 mm |
| Bias L1 GPS | m | 1 | 0 | 1 mm |
| Bias L2 GPS | m | 1 | 0 | 1 mm |
| Bias L5 GPS | m | 1 | 0 | 1 mm |
| Clock (P1) GLO | m | 1 | inf | inf |
| Bias P2 GLO | m | 1 | 0 | 1 mm |
| Bias L1 GLO | m | 1 | 0 | 1 mm |
| Bias L2 GLO | m | 1 | 0 | 1 mm |
| Zenithal tropospheric delay | m | 1 | 0.5 m | 0.005 mm |
| Ionospheric delay (slant) | m | 1 per satellite (70) | 10 m | 2 mm |
| Phase ambiguity Ne | Cycle | 1 per satellite (70) | inf | 0 |
| Phase ambiguity Nw | Cycle | 1 per satellite (70) | Inf | 0 |
| Phase ambiguity N1 | Cycle | 1 per satellite (70) | inf | 0 |
| Phase ambiguity dNe | Cycle | 1 per satellite (70) | 0 routine inf if gap-bridging | 0 |
| Phase ambiguity dNw | Cycle | 1 per satellite (70) | 0 routine inf if gap-bridging | 0 |
| Phase ambiguity dN1 | Cycle | 1 per satellite (70) | 0 routine inf if gap-bridging | 0 |

FIG.4a

| Model term | Amplitude (m) |
|---|---|
| Propagation distance | 107 |
| Solid earth tide | 0.10 |
| Phase Wind-Up | 0.10 |
| Troposphere | 0.10 |
| Attitude law | 0.10 |
| Satellites and stations PCV and PCO | 0.01 |
| Relativistic effects | 0.005 |

GNSS RECEIVER WITH A CAPABILITY TO RESOLVE AMBIGUITIES USING AN UNCOMBINED FORMULATION

FIELD OF THE INVENTION

The present invention applies to the field of satellite navigation. More specifically the invention allows a satellite navigation receiver with a triple frequency capability to perform precise positioning in an improved manner.

BACKGROUND

There are two Global Navigation Satellite Systems (GNSS) which have been fully deployed for a number of years (the US Global Positioning System, the Russian GLONASS) and two more which are under deployment (the Chinese Beidou Navigation Satellite System and the European Galileo system). These systems rely on the same principles: microwave radio signals are broadcasted from a number of satellites which orbit on a non-geostationary orbit; the signals carry a code which is correlated with a local replica in a receiver configured to receive the broadcasted signals; when a receiver is capable of acquiring and tracking signals from a minimum number of satellites (generally four), it is able to calculate its own position, velocity, time (PVT) from the pseudo-ranges of the satellites in view.

The precision of the pseudo-ranges is significantly affected by the impact of the course of the radio signals through the atmosphere (ionosphere and troposphere) which can generate an error of more than 10 m. All GNSS offer two signals on two different frequencies, which are used to eliminate the atmospheric errors and perform Precise Point Positioning.

The precision of the pseudo-ranges is also greatly enhanced by using not only the standard code measurements, but also by using the carrier phase measurements. Code measurements have a standard precision (without error corrections) of about 10 m. Carrier phase measurements can yield a cm level precision. But carrier phase measurement is ambiguous by nature, i.e. the number of cycles of carrier signal at the time of measurement is not determined easily from the raw signal of a single carrier. This is notably because the carrier phase ambiguities are impacted by receiver and satellite biases.

Techniques have been developed over time to resolve these ambiguities.

Methods of ambiguity resolution of a first type rely on a Single Difference of observations of signals received by a reference receiver from two different satellites, which eliminate the satellites biases, or from a single satellite at two different reference receivers, which eliminate the reference receivers biases.

Methods of ambiguity resolution of a second type rely on a Double Difference of observations of signals received by two reference receivers from two different satellites, which eliminate both the satellites and reference receivers biases.

Both methods of the first and the second types process the signals of each frequency independently.

Methods of ambiguity resolution of a third type rely on a Zero Difference of observations of signals received by all reference receivers from all satellites in view. The ambiguity resolution of this third type relies on a direct process of calculation of the biases of carrier phase signals, without calculating differences. A method of this third type is disclosed by European patent no EP2140285 assigned to the applicant of the present application. But these methods still rely on a combination of the phase biases in time group delays.

The methods of the third type work well but are implementation dependent. Also, their complexity is significantly increased for triple frequency signals because of the number of possible combinations of signals (from four to nine, in theory).

There is therefore a need for a method to resolve the carrier phase ambiguities without combining the phase biases of the signals.

SUMMARY OF THE INVENTION

It is an object of the invention to provide these improvements over the prior art.

It achieves this goal by providing a triple frequency GNSS receiver directly using the code and phase biases of the signals, as well as the carrier phase ambiguities for each satellite in the GNSS constellations, in an observation model.

To this effect, the invention discloses a receiver of GNSS positioning signals comprising: N-plets of signal processing channels, each signal processing channel in an N-plet configured to acquire and track positioning signals emitted by a satellite on N different carriers, and comprising tracking circuits configured for tracking code and carrier signals at a given frequency of one of the N carriers, said tracking producing an output comprising values of a propagation distance between the receiver and the satellite at the given frequency; one or more filtering circuits configured for calculating a predicted pseudo-range value and a predicted phase value for the satellite at the output of an observation model; wherein N is an integer equal to or higher than two, and said observation model receives as input a measurement vector comprising the values output of the tracking circuits of the N-plets of signal processing channels and produces its output using a state vector comprising a receiver position value, a receiver clock value, code and phase biases for the receiver, and carrier phase ambiguities, each carrier phase ambiguity characterizing one of a carrier and a combination of carriers selected from the N different carriers, and does not receive as input measurements sent from another receiver.

Advantageously, N equals to or is higher than 3 and a carrier phase ambiguity in the state vector characterizes one of a widelane and an extra widelane combination of the N carriers.

Advantageously, the state vector comprises variables representative of the carrier phase ambiguities of a first frequency carrier, a widelane and an extra widelane, and the observation model comprises a bootstrap calculation which solves the ambiguities at each time interval, starting with the extrawidelane carrier.

Advantageously, the observation model further receives as input corrections of one of a Sagnac effect, a solid earth tide effect, a phase wind-up effect, a ionospheric error, a troposheric error, an orbital error and a relativistic error.

Advantageously, the observations model receives as input corrections of a ionospheric error and a tropospheric error which are modulated by a local meteorological a priori.

Advantageously, the observation model uses as initial position of the receiver an average of pseudo-ranges between the receiver and a number of satellites in view.

Advantageously, the observation model uses a matrix of co-variances which is updated using a Bierman algorithm and which is propagated using a Thornton algorithm.

Advantageously, the measurement vector and the state vector comprise data from a plurality of satellites, at least two in the plurality of satellites belonging to two different constellations.

Advantageously, a measured value at the output of the tracking circuit is filtered out of the measurement vector if its residual to a predicted value is higher than a first predetermined threshold.

Advantageously, measured values at the output of the tracking circuit are kept in the measurement vector if their residuals to predicted values are lower than a second predetermined threshold and their number is maximum, after iterative filtering out of the measurement vector of combinations of said measured values.

Advantageously, the state vector further comprises integer phase carrier jumps, each integer phase carrier jump being used to test an initial value of a carrier phase ambiguity after a loss of signal.

Advantageously, code measurements used in the tracking circuit and the filtering circuit are smoothed in a filter of order one using a Doppler measurement of the carrier modulated by the code measurement.

Advantageously, the observation model takes into account at a time measurements which have a time difference with a clock of the satellite smaller than a preset value.

The invention also discloses a method of positioning a receiver of GNSS signals comprising: acquiring N-plets of GNSS signals at signal processing channels, each signal processing channel in an N-plet configured to acquire and track positioning signals emitted by a satellite on N different carriers, and comprising tracking circuits configured for tracking code and carrier signals at a given frequency of one of the N carriers, said tracking producing an output comprising values of a propagation distance between the receiver and the satellite at the given frequency; calculating at one or more filtering circuits a predicted pseudo-range value and a predicted phase value for the satellite at the output of an observation model; wherein N is an integer equal to or higher than two, and said observation model receives as input a measurement vector comprising the values output of the tracking circuits of the N signal processing channels and produces its output using a state vector comprising a receiver position value, a receiver clock value, code and phase biases for the receiver, and carrier phase ambiguities, each carrier phase ambiguity characterizing one of a carrier and a combination of carriers selected from the N different carriers, and does not receive as input measurements sent from another receiver.

The invention also discloses a computer program for positioning a receiver of GNSS signals comprising: computer code instructions configured to acquire N-plets of GNSS signals at N-plets of signal processing channels, each signal processing channel in the N-plet configured to acquire and track positioning signals emitted by a satellite on N different carriers, and comprising tracking circuits configured for tracking code and carrier signals at a given frequency of one of the N carriers, said tracking producing an output comprising values of a propagation distance between the receiver and the satellite at the given frequency; computer code instructions configured to calculate at one or more filtering circuits a predicted pseudo-range value and a predicted phase value for the satellite at the output of an observation model; wherein N is an integer equal to or higher than two, and said observation model receives as input a measurement vector comprising the values output of the tracking circuits of the N-plets of signal processing channels and produces its output using a state vector comprising a receiver position value, a receiver clock value, code and phase biases for the receiver, and carrier phase ambiguities, each carrier phase ambiguity characterizing one of a carrier and a combination of carriers selected from the N different carriers, and does not receive as input measurements sent from another receiver.

It is an advantage of the invention to accommodate a number of different combinations of carrier frequencies in the receiver to resolve ambiguities. Generally speaking, thanks to the invention, convergence of a triple frequency receiver is greatly shortened. Also, in some embodiments of the invention, an enhanced integrity is provided. In some embodiments, a receiver has an in-built capability to recover the signals after a loss of sight. In some embodiments, noise of the code signals is significantly reduced. Also, in some embodiments, the short term noise of a Precise Point Positioning solution is reduced.

BRIEF DESCRIPTION OF THE DRAWINGS

The invention will be better understood and its various features and advantages will become apparent from the description of various embodiments and of the following appended figures:

FIGS. 4a and 4b respectively display a list of some parameters of the state vector of an observation model and a list of some parameters of a measurement model according to some embodiments of the invention;

FIG. 5 illustrates the convergence of a triple frequency GNSS receiver in some embodiments of the invention;

DETAILED DESCRIPTION

Figure 1:
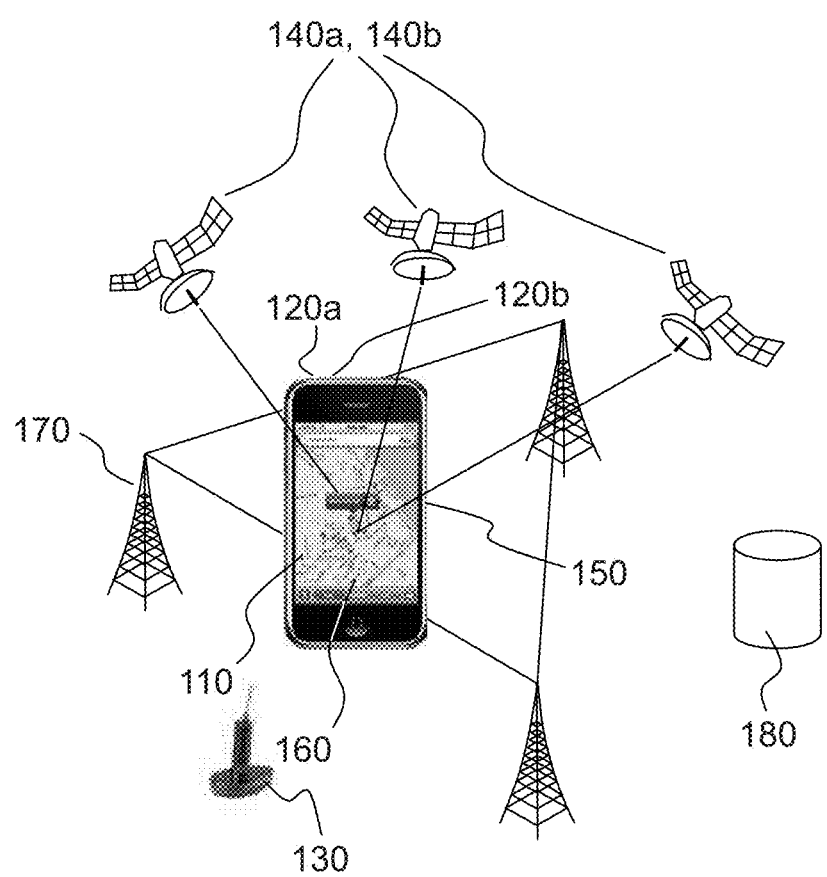
FIG. 1 represents a system which enables the implementation of the invention in a number of its embodiments.

FIG. 1 represents a system which enables the implementation of the invention in a number of its embodiments.

There are number of types of GNSS receivers which may be more or less compact. Only by way of example of the field of application of the invention, FIG. 1 depicts a terminal which is a smart phone 110 with functionalities for acquiring signals from at least a constellation of navigation satellites 140. The terminal should have a specific antenna, 120a, for acquiring the signal(s) of the satellites. It is also possible to also have an add-on external antenna 130 which improves the conditions of acquisition and tracking of the navigation signal. The in-built and add-on antennas can be adapted to mono, bi or triple frequency bands. The location of the add-on antenna may be chosen to improve the conditions of reception, notably on an automotive vehicle, a boat or a plane. It can be housed in a radome to limit the impact of multipath reflections. In such a configuration, a confidence index of position measurement will be excellent. If the antenna has minimal features and/or if the environment of the terminal creates a lot of multipath reflections, the confidence index of the position measurement will be much lower.

The smart phone also has an antenna 120b for receiving 3G/4G radio-communication signals. When the positioning terminal is not a smart phone, it is always possible to add a communication capability to its functionalities by using an USB key. Alternatively, the terminal can be connected to a wired communication network, either directly via an Ethernet port, or indirectly via a WiFi or Bluetooth access port.

The terminal antenna(s) allow acquiring the signals of one or more constellations of navigation satellites, 140a, 140b, currently GPS and GLONASS in the western hemisphere, and soon Galileo and Beidou. The quality of the acquisition and tracking of the signals from the minimum number of satellites which are necessary for the signal processing (four in general) will depend notably on the position of the terminal relative to the constellations satellites and on the local conditions of reception. The possibility to acquire signals from a plurality of constellations therefore improves the availability, precision and confidence index of the position measurements. There are also satellites which emit signals which contain messages for correcting the base constellation signals (Satellite Based Augmentation Signals or SBAS), such as EGNOS or INMARSAT.

The satellite signals are processed either by a dedicated integrated circuit or electronic board of the terminal or, in the case of a smart phone, by function blocks of an integrated chipset 150 which also implements other functions. Dedicated boards or chips are produced by U-Blox (for instance under reference Neo-7P™ for a precise positioning application), CSR (for instance under reference SiRFatlasVI™) and Broadcom (for example under reference BCM2075). The processing of each satellite channel which are performed by said circuits to compute Point Velocity and Time which characterize a position measurement are normally accessible to application developers. This allows an easier and more flexible implementation of various algorithms which process the output of the different satellite signals processing channels, including those which are used in the framework of the invention. In other cases, such as localization blocks of the Qualcomm gpsOne™ technology, which is integrated in the SnapDragon™ host chipset for smart phone, other algorithms may need to be used.

Positioning data at the output of the processing units can be merged with map data 160.

Terminal 110 can also obtain correction information via a wired or wireless communication link which allows access to data from specialized networks 170. This correction information can be differential or absolute real time corrections, for instance RTIGS or Real Time International GNSS Service, using the RTCM SC-104 standardized format (i.e. from Standardization Committee 104 of the Radio technical Commission for Maritime Services).

The terminal can access, locally or remotely, to data which are used by one of its processors to calculate the current precision of the positioning data (possibly corrected), as well as an evolution of such a precision along time as a function of the predicted trajectory of the terminal, of the probable evolution of the conditions of reception and of possible modifications of the hardware and software configuration of the terminal (i.e. switch between a multiple-frequency and a single-frequency mode as a function of the multi-path reflections. Such a prediction is disclosed by French patent application assigned to the applicant of the present application and filed under number FR 14/56862.

Figure 2:
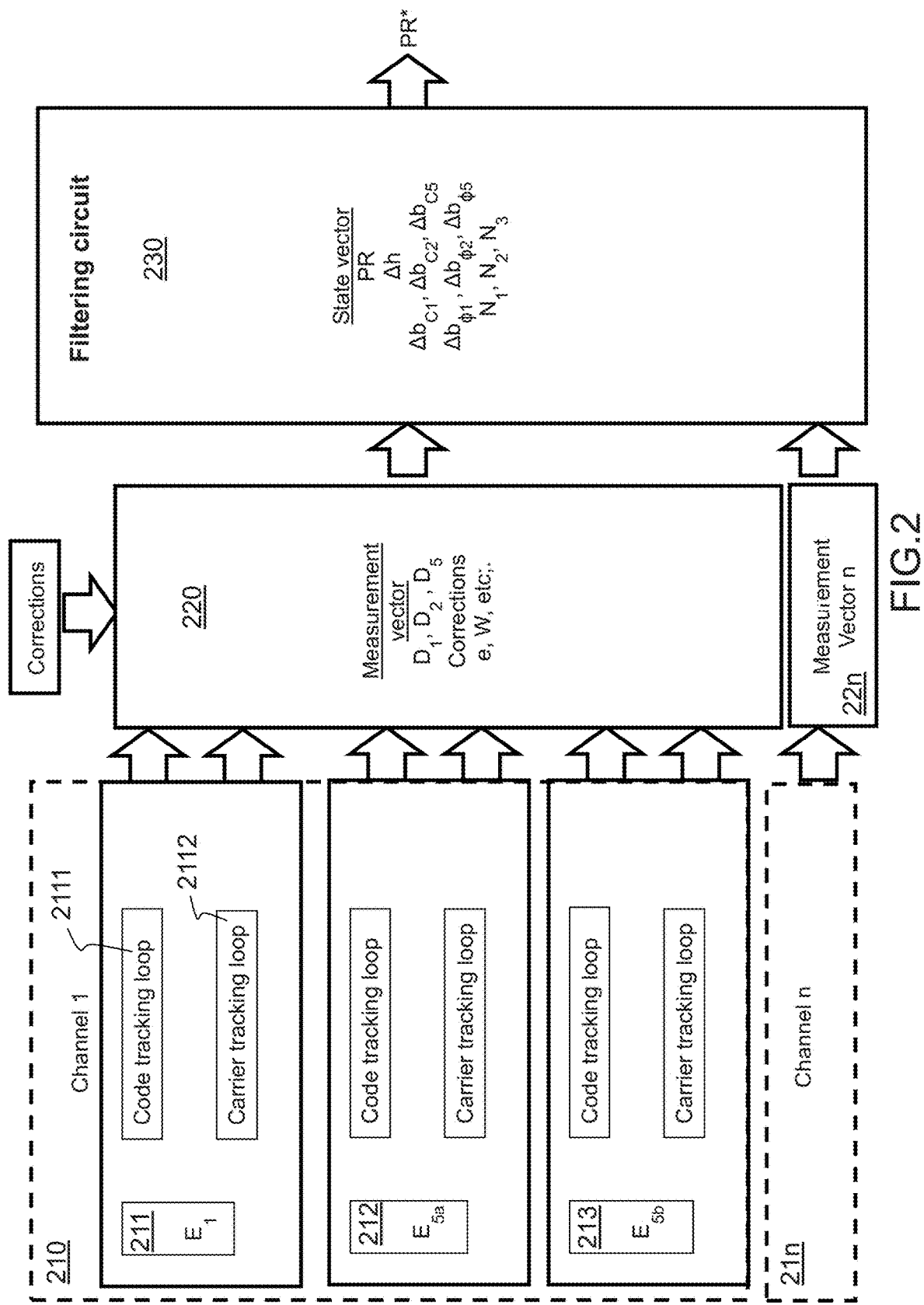
FIG. 2 represents a functional architecture of a receiver in a number of embodiments of the invention.

FIG. 2 represents a functional architecture of a receiver in a number of embodiments of the invention.

A receiver according to the invention comprises a number of signal processing channels $210, \ldots, 21n$. Each individual processing channel processes signals from one satellite in a constellation. Signals from multiple constellations may be acquired simultaneously by different processing channels. An individual processing channel includes a plurality of sub-channels or individual channels, 211, 212, 213, a sub-channel processing the signals of one carrier which is transmitted by the satellite at a defined frequency. There may be one, two, three or possibly N sub-carriers which are acquired and tracked on a channel. For instance, currently each satellite of the GPS constellation broadcasts two signals at two different frequencies, L1 and L5. The two signals can be acquired and tracked, even if the navigation messages on L5 are reserved to authorized users and cannot be decoded by a standard receiver. Each sub-channel comprises a code tracking loop 2111 and a carrier tracking loop 2112. The code tracking loop monitors the modulated signal transmitted by each satellite. The carrier tracking loop monitors the phase of the carrier. A receiver of the invention thus comprises a plurality of N-plets of individual signal processing channels, an N-plet of signal processing channels processing the signals from one satellite at a moment in time, one signal processing channel in an N-plet processing the signals from one carrier in a given frequency band for a given satellite. According to the invention, N equals 2 or more. Some circuits in an N-plet of signal processing channels may be shared by the processing channels of different frequency band.

For each channel, a measurement vector $220, \ldots, 22n$ is configured. All channels in combination allow the determination of a state vector 230 in a filtering circuit which may be a Kalman filter.

The notations are those of the two following publications: «Integer Ambiguity Resolution on undifferenced GPS Phase measurements and its application to PPP and satellite precise orbit determination», LAURICHESSE Denis, MERCIER Flavien, BERTHIAS Jean-Paul, BROCA Patrick, CERRI Luca, JournalOfNavigationVol56N02; D. Laurichesse, White Paper, "Phase biases for ambiguity resolution: from an undifferenced to an uncombined formulation".

In an embodiment of the invention where N=3, a first equation of the functional model is:

$$\gamma_2 = \frac{f_1^2}{f_2^2}, \gamma_5 = \frac{f_1^2}{f_5^2}, \lambda_1 = \frac{c}{f_1}, \lambda_2 = \frac{c}{f_2}, \lambda_5 = \frac{c}{f_5}$$

where $f_1$, $f_2$ and $f_5$ are the three frequencies of the GPS system (L1, L2, L5) or the Galileo system (E1, E5a, E5b) and c is the speed of light in vacuo. For the GPS L1, L2 and L5 bands, $f1=154f0$, $f2=120f0$ and $f5=11.5f0$, where f0=10.23 MHz. For Galileo, f1 is the same (E1), f2 can be replaced by 120 f0 (E5a) and f5 can be replaced by 118 f0 (E5b).

Pseudo-range or code measurements, $P_1$ $P_2$ and $P_5$, are expressed in meters, while phase measurements, $L_1$ $L_2$ and $L_5$ (or $E_1$, $E_{5a}$, $E_{5b}$ in the case of Galileo), are expressed in cycles.

Other equations of the model are:

$$P_1 + \Delta b_{P_1} = D_1 + e + \Delta h$$

$$P_2 + \Delta b_{P_2} = D_2 + \gamma_2 e + \Delta h$$

$$C_5 + \Delta b_{C_5} = D_5 + \gamma_5 e + \Delta h$$

$$\lambda_1(L_1 + \Delta b_{L_1}) = D_1 + \lambda_1 W - e + \Delta h - \lambda_1 N_1'$$

$$\lambda_2(L_2 + \Delta b_{L_2}) = D_2 + \lambda_2 W - \gamma_2 e + \Delta h - \lambda_2(N_W' + N_1')$$

$$\lambda_5(L_5 + \Delta b_{L_5}) = D_5 + \lambda_5 W - \gamma_5 e + \Delta h - \lambda_5(N_E' + N_W' + N_1')$$

$$N_1' = N_1 + \delta N_1$$

$$N_W' = N_W + \delta N_W$$

$$N_E' = N_E + \delta N_E$$

where:
- $D_1$, $D_2$ and $D_5$ are the geometrical propagation distances between the emitter and receiver phase centers at $f_1$, $f_2$ and $f_5$ including troposphere elongation, relativistic effects, etc.
- W is the contribution of the wind-up effect (in cycles).
- e is the ionosphere elongation in meters at $f_1$. This elongation varies with the inverse of the square of the frequency and with opposite signs between phase and code.
- $\Delta h = h_i - h^j$ is the difference between receiver i and emitter j ionosphere-free phase clocks. $\Delta h_p$ is the corresponding term for pseudorange clocks.
- $N_1'$ $N_w'$ and $N_E'$ are the three carrier phase ambiguities, respectively $N_1$, Widelane and Extra-widelane. By definition, these ambiguities are integers. The $\delta N_1$, $\delta N_W$, $\delta N_E$ quantities are also integer values, introduced for technical purposes (gap-bridging capability as will be explained further in the description). In routine mode, these quantities are set to 0.
- $\Delta b_p = b_{Pi} - b_P^j$ is the difference between receiver i and emitter j code biases, as defined in the RTCM standard (Paper 055-2010-SC104-582 "ssr_sv_orbit_clock_biases_4pm_SC104_v04").
- $\Delta L_P = L_{Pi} - L_P^j$ is the difference between receiver i and emitter j phase biases, as defined in the RTCM standard (Stage 2: "Satellite Phase Biases for RTCM STANDARD" 10403.2 DIFFERENTIAL GNSS (GLOBAL NAVIGATION SATELLITE SYSTEMS) SERVICES—VERSION 3 DEVELOPED BY RTCM SPECIAL COMMITTEE NO. 104 Feb. 1, 2013B).

In general, the Δ operator represents a difference between a receiver and emitter quantity. In this model, there is one receiver quantity per constellation. The use of measurements from a single receiver differentiates the invention from methods and systems that rely on one or more reference receivers, like Differential GNSS systems. Thus, the observation model of the invention solves the carriers ambiguities without a recourse to other receivers to eliminate the satellites and receiver clocks biases. The model used by the rover may use corrections, notably atmospheric corrections coming from a processing center, but no measurement coming from reference receivers.

At the output of the filtering circuit, a pseudo-range is determined.

Figure 3:
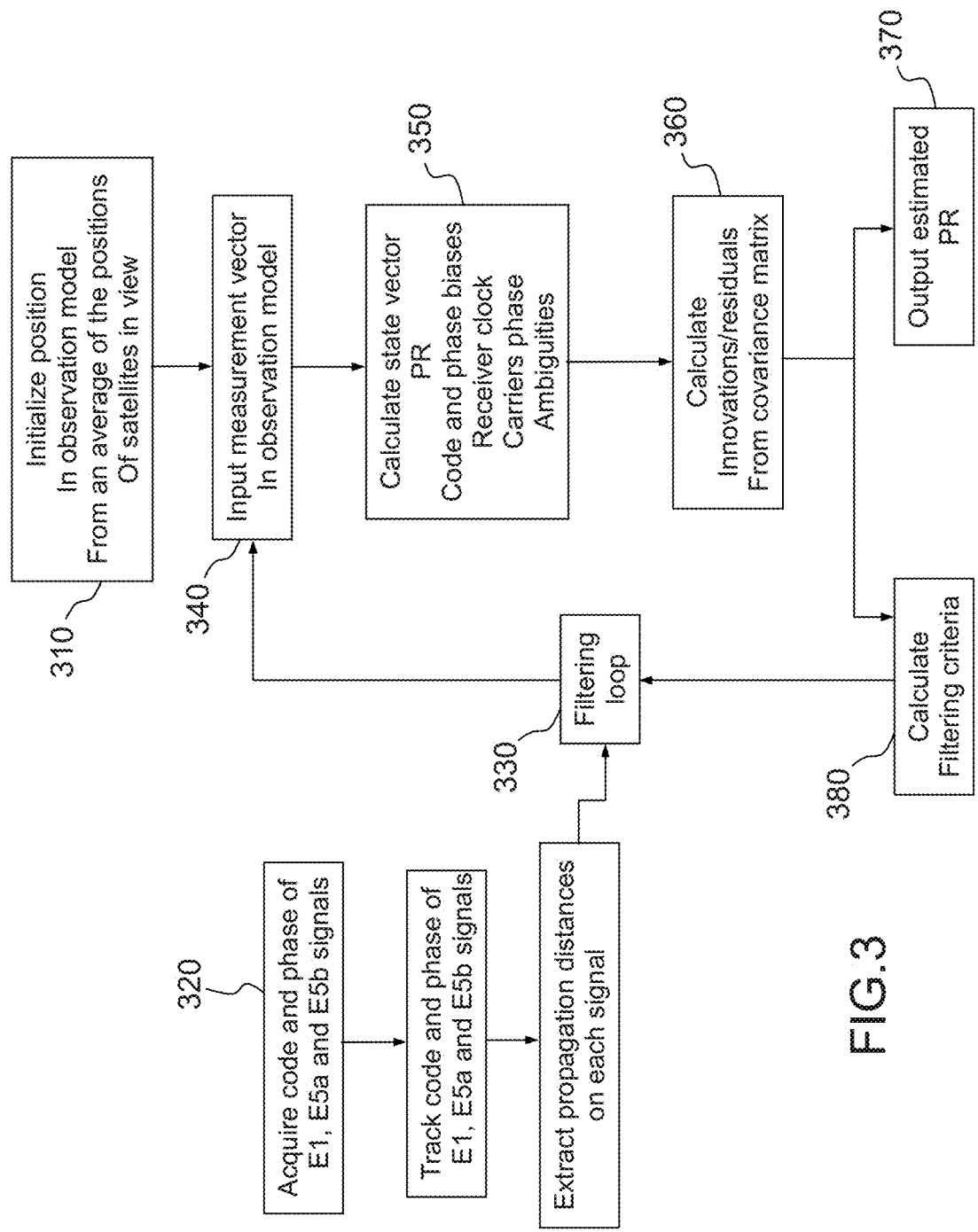
FIG. 3 is a flow chart of a method to implement the invention according to a number of its embodiments.

FIG. 3 is a flow chart of a method to implement the invention according to a number of its embodiments.

At a step 310, an initial value of the position of the receiver is determined. This initial value does not need to be determined at a precision better than 100 m, which is within the linear domain of the model used to implement the invention. In an embodiment of the invention, this initial value is calculated at each calculation step from code measurements on the first frequency (E1 for instance).

A first position is calculated based on an average of the positions of the satellites in view. The position is then adjusted at step 330 using a least squares minimization algorithm with the other satellites using the propagation distances from all sub-channels (step 320) until convergence of the calculation. Erroneous values are possibly eliminated.

Also, all measurement vectors are entered into the observation model of the filtering circuit (step 340). The state vector is calculated at step 350, including the values of the code and phase biases, the receiver clock and the carrier phase ambiguities. As is classical in a Kalman filter, the residuals, a covariance matrix and the innovations are then calculated (step 360), so that a estimated pseudo-range is produced (step 370) and the filtering criteria may be adjusted (step 380).

Other kind of arrangements of the operation of the observation model (Kalman filter or other) may be implemented. For instance, other modes of initializations may be used, such as a position of the receiver calculated from other sensors (for instance an inertial navigation system) or using a map.

Figures 4B, 5:
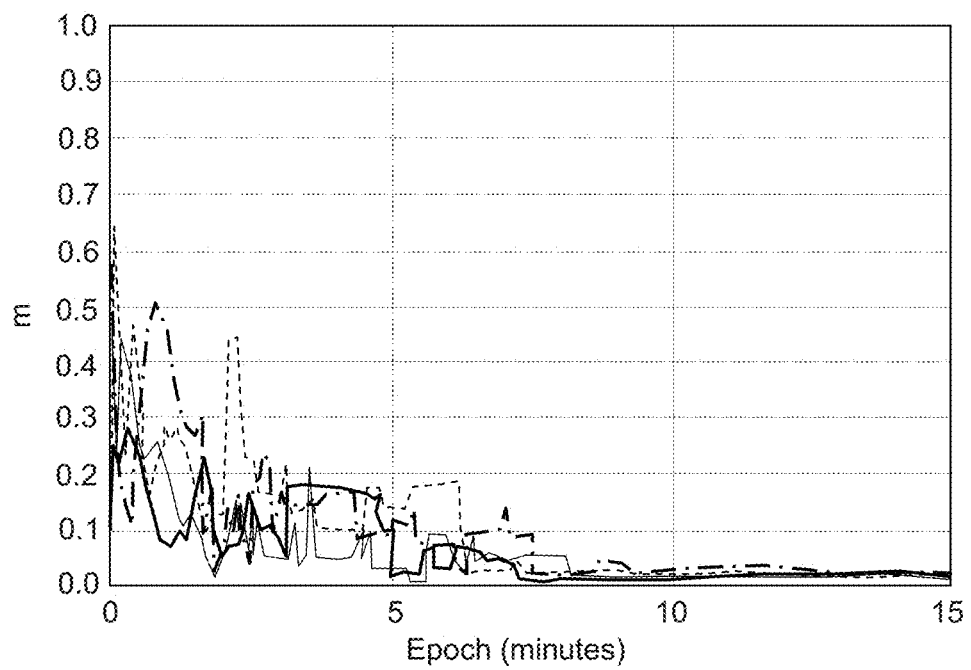

FIGS. 4a and 4b respectively display a list of some parameters of the state vector of an observation model and a list of some parameters of a measurement model according to some embodiments of the invention.

By way of example, the state vector of the observation model (Extended Kalman filter) displayed on FIG. 4a corresponds to an embodiment of the invention with a receiver which is capable of tracking GPS and GLONAS satellites.

A position and clocks (one for each constellation) of the receiver are defined as variables of the state vector. Also, code and phase biases for each frequency of each constellation are included. In an embodiment of the invention, a zenithal tropospheric delay is included and an ionospheric delay per satellite are also included.

Then, three phase ambiguities per satellite are included. In a case with three carrier frequencies, they can advantageously relate to:
- The Narrowlane ($N_1$), which is one of the $c/(f_i+f_j)$ carrier combinations, where i and j are selected to be 1 and 2, in the case of the GPS constellation, and 1 and 5a or 5b, for $E_{5a}$, $E_{5b}$, in the case of the Galileo constellation;
- The Widelane ($N_W$), which is one of the $c/(f_i-f_j)$ carrier combinations, where i and j are selected to be 1 and 2, in the case of the GPS constellation, and 1 and 5a or 5b, for $E_{5a}$, $E_{5b}$, in the case of the Galileo constellation;
- The Extrawidelane ($N_E$), which is which is one of the $c/(f_i-f_j)$ carrier combinations, where i and j are selected to be 2 and 5 in the case of the GPS constellation, and 5a and 5b, for $E_{5a}$, $E_{5b}$, in the case of the Galileo constellation.

It is possible to use a general formulation of the Kalman filter of the P=UDU' form, with U an upper triangular matrix and D a squared diagonal matrix. The update of the solution matrix follows the Bierman algorithm (G. J. Bierman, "Measurement Updating Using the U-D Factorization", Automatica, Volume 12, Issue 4, July 1976, Pages 375-382), while the propagation of the solution uses the Thornton algorithm (C. L. Thornton, G. J. Bierman, "Gram-Schmidt Algorithms for Covariance Propagation", International Journal of Control, Volume 25, Issue 2, 1977).

The parameterization of the filter advantageously follows the functional model described above in relation with FIG. 2. The satellite part of the functional model quantities (positions, clocks, biases) are known and thus are not identified. Only the receiver parameters are estimated in the state vector. For practical reasons, the receiver clock is directly estimated in the biases ($h_i$=0).

The propagation step of the filter may be relatively simple when the transition matrix of the parameters equals the identity. Thus, this step consists only in the addition of a diagonal model noise on each parameter.

The correction step of the Kalman filter involves a modeled measurement set at the current epoch. Advantageously, the corrections displayed on the table of FIG. 4b are used.

The propagation distance will advantageously include an estimation of the Sagnac effect. The solid earth tide effect can be modeled using a routine. For instance, one may use the routine provided by the International Earth Rotation and Reference Systems Service (reference dehanttideinel.f, V. Dehant, IERS Conventions (2010)). A model of the phase wind-up is disclosed in Effects of antenna orientation on GPS carrier phase, WU. J. T, Hajj G. A., Bertiguer W. I, Lichten S. M, Jan. 1, 1993, Édit. 1, Manuscripta Geodaetica.

The calculations in the filter will preserve the integer nature of ambiguities thanks to the use of the appropriate phase biases RTCM message. The identification of the integer ambiguities is performed with a bootstrap method ("A Comparison of TCAR, CIR and LAMBDA GNSS Ambiguity Resolution", Peter Teunissen, Peter Joosten and Christian Tiberius, proceedings of ION GPS 2002, Portland, Oreg.): after an initial apriori fix, the remaining ambiguities are fixed iteratively. This technique allows partial ambiguity fixing. To facilitate the estimation process, ambiguities are fixed in a cascading scheme: first the extra-widelane $N_e$, then the widelane $N_w$ and then $N_1$. The ambiguity resolution process may be restarted at each epoch to avoid maintaining a wrong ambiguity solution.

FIG. 5 illustrates the convergence of a triple frequency GNSS receiver in some embodiments of the invention.

The curves on the figures represent the precision of the position of the rover in cm epoch by epoch using measurements from four GPS satellites in view. Convergence time is lower than 5 mn with three frequencies in a receiver according to the invention, whereas convergence time for a two-frequencies configuration is higher than 40 minutes.

Figure 6A:
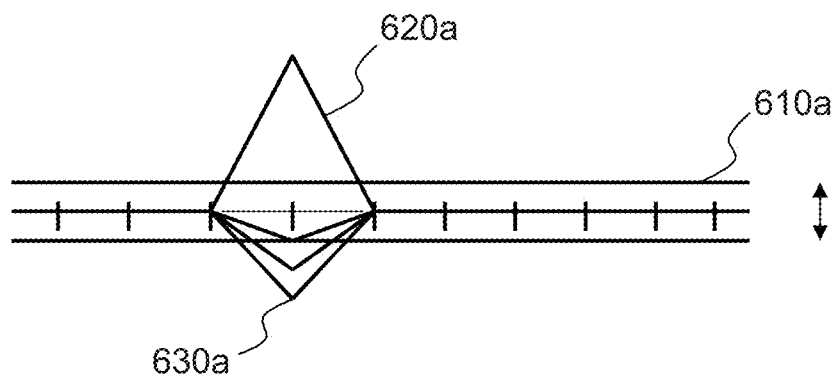
FIGS. 6a and 6b illustrate two variants of a RAIM algorithm in some embodiments of the invention.
Figure 6B:
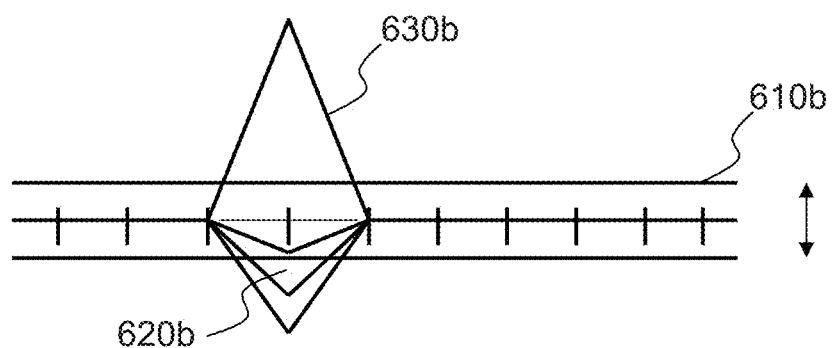

FIGS. 6a and 6b illustrate two variants of a RAIM algorithm in some embodiments of the invention.

The RAIM (Receiver Autonomous Integrity Monitoring) is a generic mechanism to detect and possibly exclude false measurements at the receiver level. It is in general based on measurements redundancy. According to the invention, multiple variants of FDE (Fault Detection and Exclusion) mechanisms may be implemented:

Simple RAIM: Generally speaking, a false measurement is detected when the measurement residual is above a certain threshold 610a. The threshold is context dependent. For instance, a number of 3 RMS (Root Mean Square) of the carrier phase noise may be selected as a threshold for a number of applications. This is an RMS of about 5 cm. Note that the RAIM procedure is applied for each carrier at a given frequency for a given satellite, i.e. for 10 satellites in view which transmit 3 carriers, the number of measurements is 30. As described in FIG. 6a, an erroneous measurement 620a can contaminate the others residuals, 630a and may lead to wrong exclusions. This is why an iterative elimination is performed: after each elimination, a new solution, including new residuals, is computed.

Advanced RAIM: The idea of this other embodiment of the invention is based on the observation that it is not necessarily the erroneous measurement, 630b, that gives the worse residual i.e. the residual of the erroneous measurement can be below the threshold (FIG. 6b).

According to this embodiment, a list of measurements from all satellites in view at an epoch which are candidates for exclusion is determined (i.e. the residuals of which are above the defined threshold). Then, all the combinations of measurements are tested (one by one, then two by two, etc.) until a combination is found where the number of measurements which are withdrawn from the original set of measurements is minimal and all the remaining residuals, 620b, are below the threshold 610b. Typically, depending on the computing power available in the receiver, a number of 2 or 3 candidates for exclusion will achieve a good compromise between precision and latency: too many candidates would increase latency because of the exponential effect on the calculation time of the combinations and too few candidates would not improve the result over a simple RAIM algorithm.

Figure 8:
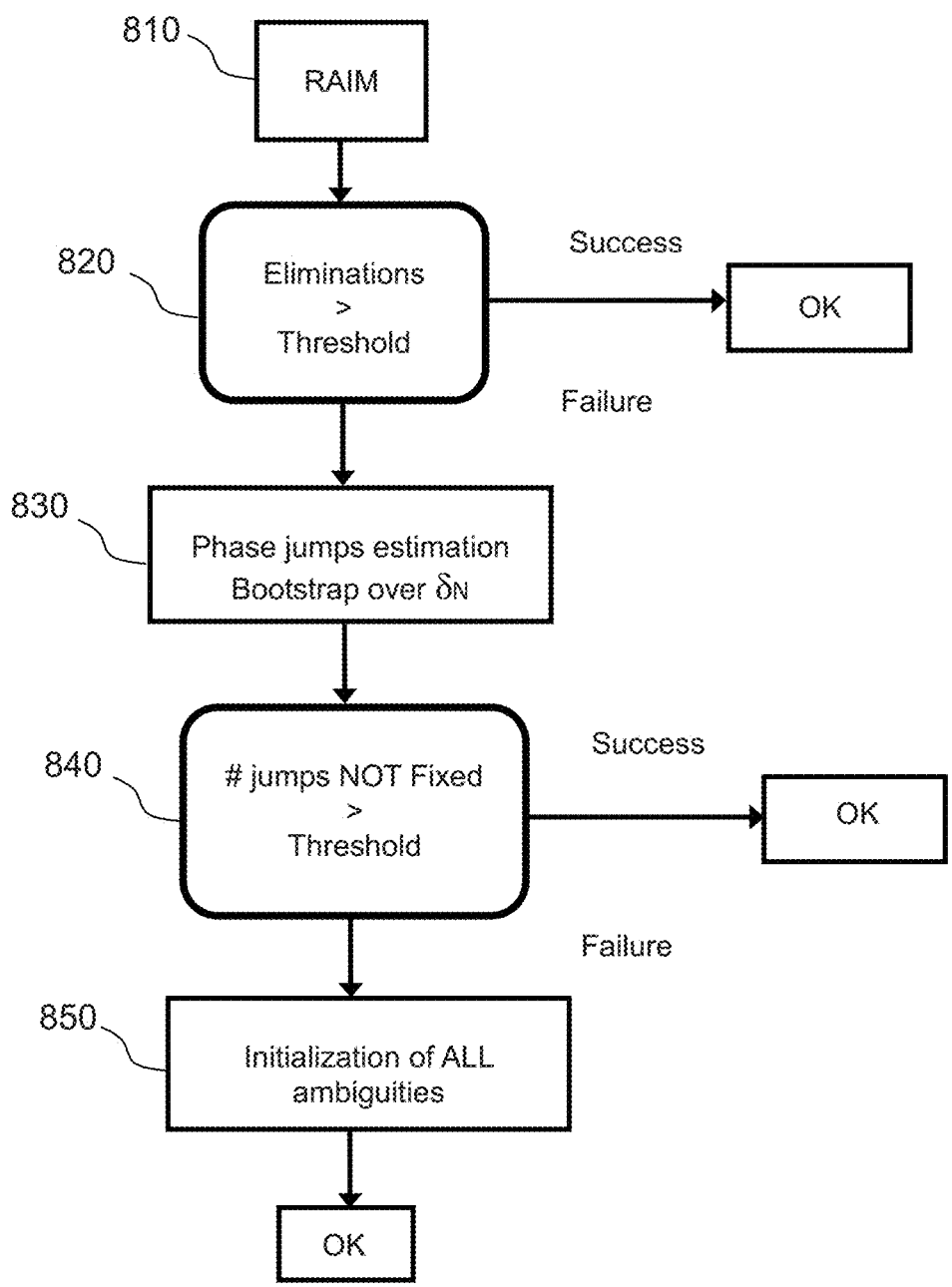
FIG. 8 is a flow chart of gap-bridging algorithm in some embodiments of the invention.
Figure 9A:
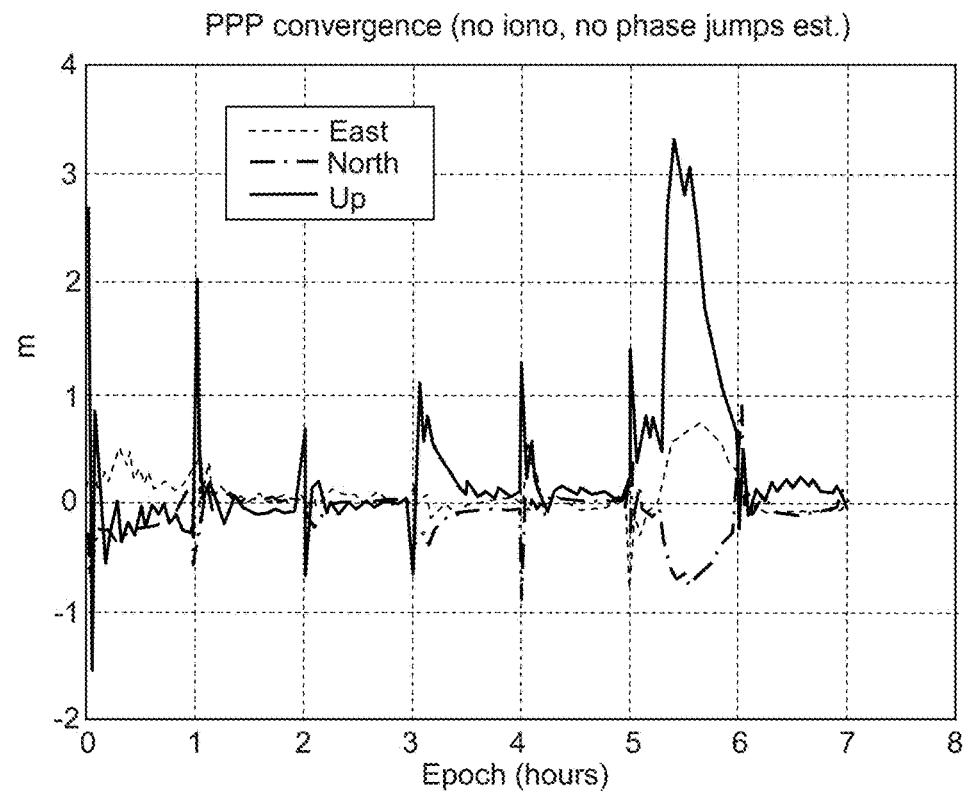
FIGS. 9a and 9b illustrate the impact of the use of the gap-bridging algorithm of FIG. 8.
Figure 9B:
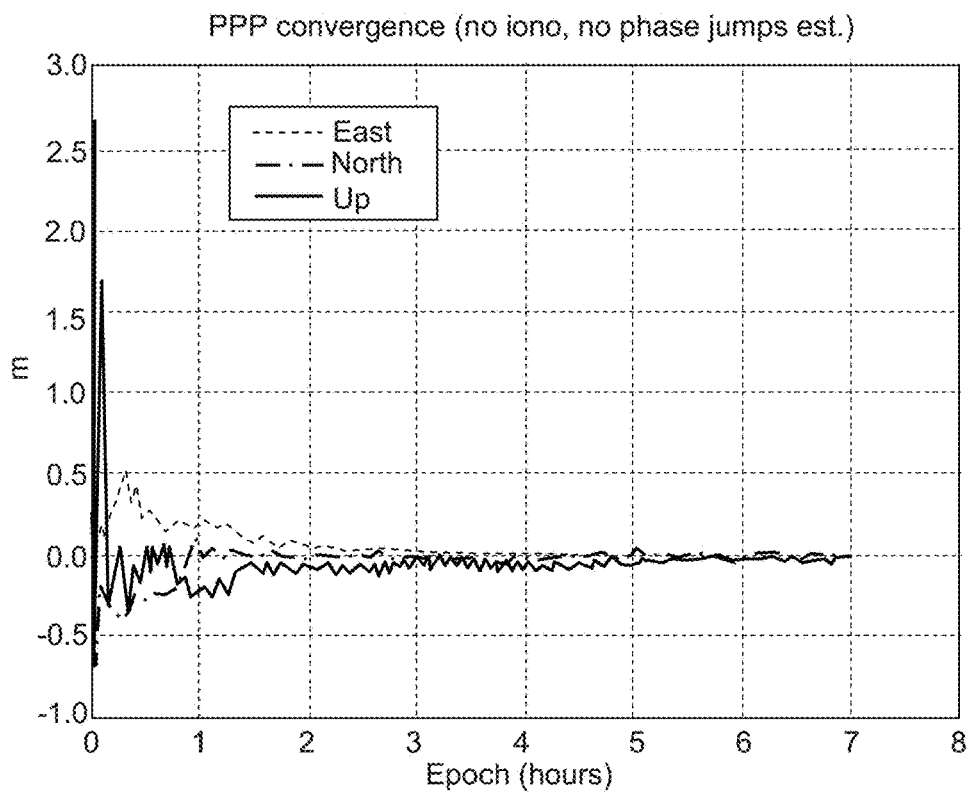

If no measurement over a number of epochs satisfies the RAIM criteria, it is possible to apply a gap-bridging procedure, as described further in the description in relation to FIGS. 8, 9a and 9b.

Figure 7A:
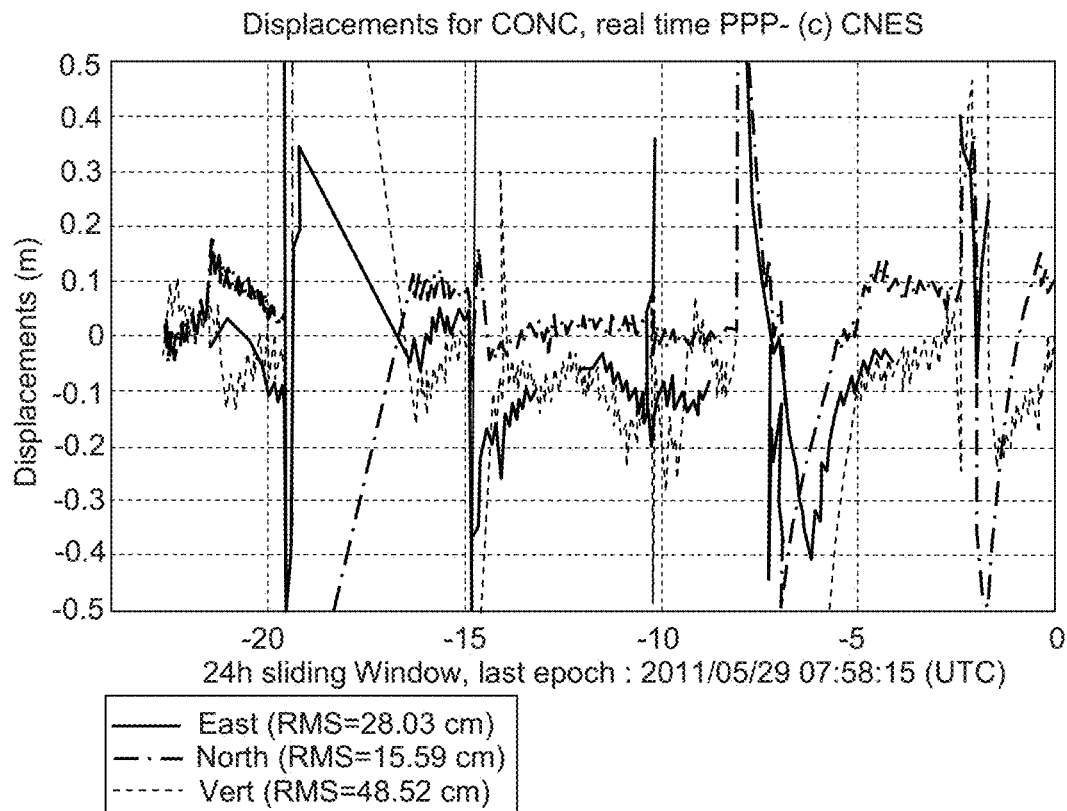
FIGS. 7a and 7b illustrate respectively the impact on outlier detection of a triple frequency GNSS receiver of the two variants of a RAIM algorithm of FIGS. 6a and 6b.
Figure 7B:
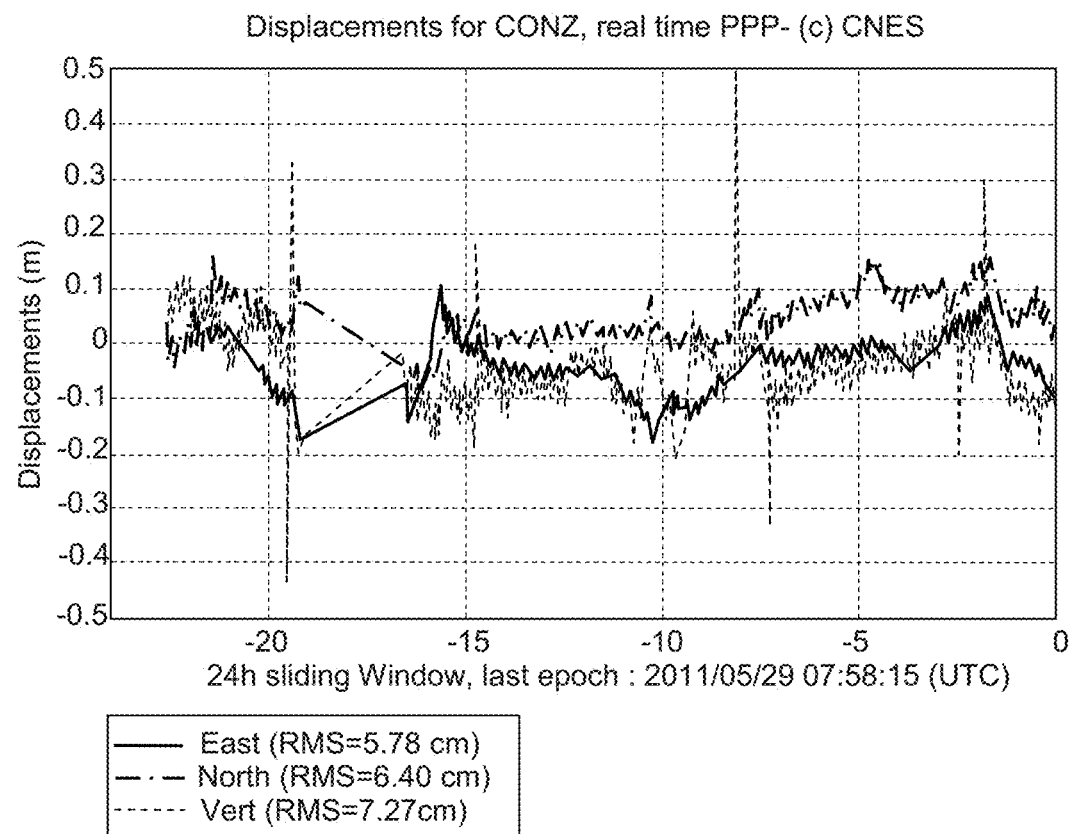

FIGS. 7a and 7b illustrate respectively the impact on outlier detection of a triple frequency GNSS receiver of the two variants of a RAIM algorithm of FIGS. 6a and 6b.

Both figures display displacements in cm (ordinate) in three different directions (East North, Vertical) on a sliding 24h sliding window of a reference point, when implementing the invention with the two variants of RAIM.

The number of outliers (i.e. measurements which are out of a defined confidence band) on FIG. 7a is still high, with high absolute values (in excess of 10 cm). Note that, because of the very poor signal reception at the receiver of which the measurements are displayed here, no calculation of the navigation solution would be possible without any RAIM mechanism, On FIG. 7b, the RAIM calculation is based on the advanced RAIM method explained in relation with FIG. 6b above. The reduction of the number and magnitude of outliers (all values are below 10 cm) is quite significant. A triple frequency band receiver is not necessary to achieve this improvement. A dual frequency band receiver can take advantage of this improvement, as well as a mono frequency band receiver. But of course, the selective availability corresponding to a defined RAIM threshold will be better for a higher number of frequency bands. Note that the RAIM procedure may be performed with signals from satellites which belong to different GNSS constellations.

FIG. 8 is a flow chart of gap-bridging algorithm in some embodiments of the invention.

Gap-bridging is a technique that allows passing over gaps of measurements or which is used on initialization of a receiver. The set of ambiguities may be completely different before and after the gap. The typical duration of a gap is less than one minute. This event generally occurs when the receiver passes through a tunnel or under a bridge.

According to the invention, during the gap, a receiver is able to maintain some of its internal state (typically the troposphere and the ionosphere), to ensure a fast re-convergence. In addition, if one assumes that the jumps of ambiguities are of integer values, it is possible to estimate these jumps. It is worth noting however that this functionality does not need the individual ambiguities to be estimated as integer values. Only the jumps need to be estimated. Jump estimation is possible thanks to the estimation of δN parameters of the filter and a bootstrap resolution, notably in the equations commented upon above in relation to FIG. 2. Note that this procedure may be carried out with two carriers per satellite, using a bootstrap with a widelane signal and a narrowlane signal. In particular, this is the reason why the technique also works for the Glonass constellation.

At step 810, a RAIM algorithm according to one of the embodiments of FIGS. 6*a* and 6*b* is executed. At a step 820, the receiver tests if some of the measurements have been eliminated because they exceeded the threshold set for the confidence interval. If so, at a step 830, the phase jumps are estimated using the bootstrap calculation with the $\delta N_1$, $\delta N_W$, $\delta N_E$ values of integer ambiguities which can be considered as carrier phase integer ambiguities corrections. At a step 840, the receiver then tests if some of the phase jumps which are not fixed are above the threshold set for the confidence interval. If so, all the ambiguities are re-initialized at a step 850

FIGS. 9*a* and 9*b* illustrate the impact of the use of the gap-bridging algorithm of FIG. 8.

On both FIGS. 9*a* and 9*b*, artificial jumps are generated every hour.

On FIG. 9*a*, the system does not use the ionospheric correction and phase jump estimates.

On FIG. 9*b*, the algorithm of FIG. 8 is implemented, i.e. the ionospheric corrections and phase jumb estimates. It can be seen that, when the gap-bridging function is implemented, there is no loss of confidence in the precision of the measurements and that the accurate measurements are secured rapidly after each artificial jump. In any event, the efficiency of the gap-bridging processing is better when the duration of the gap is not too high.

Figure 10A:
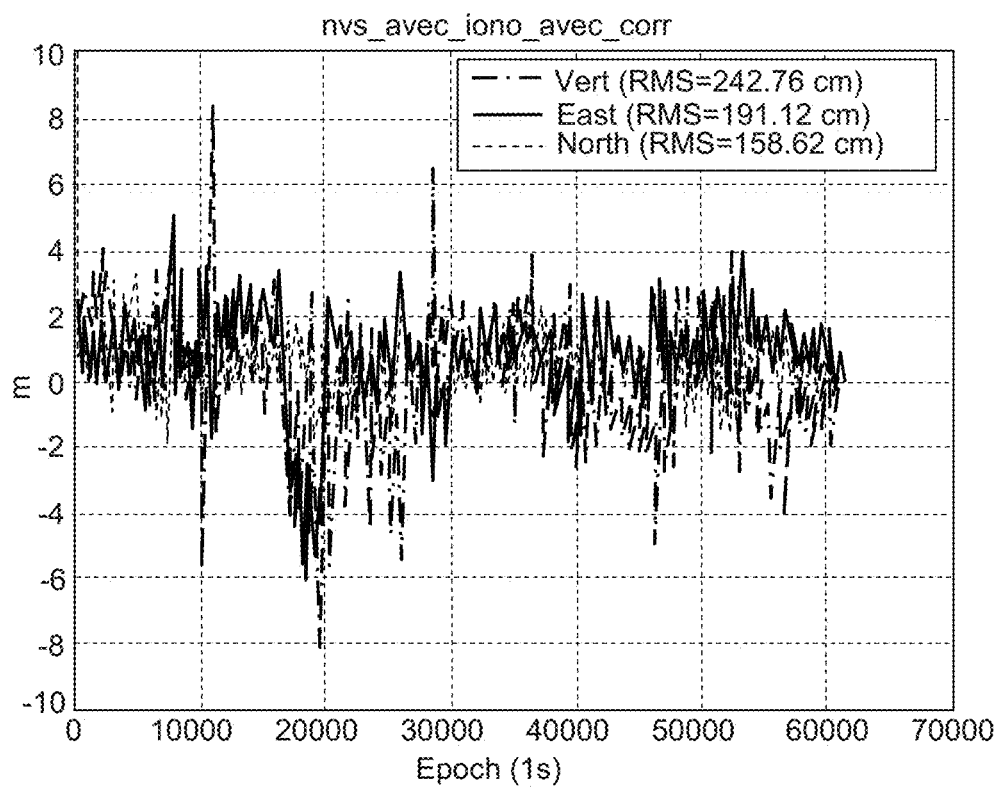
FIGS. 10a and 10b illustrate the impact of a Doppler smoothing algorithm according to some embodiments of the invention.
Figure 10B:
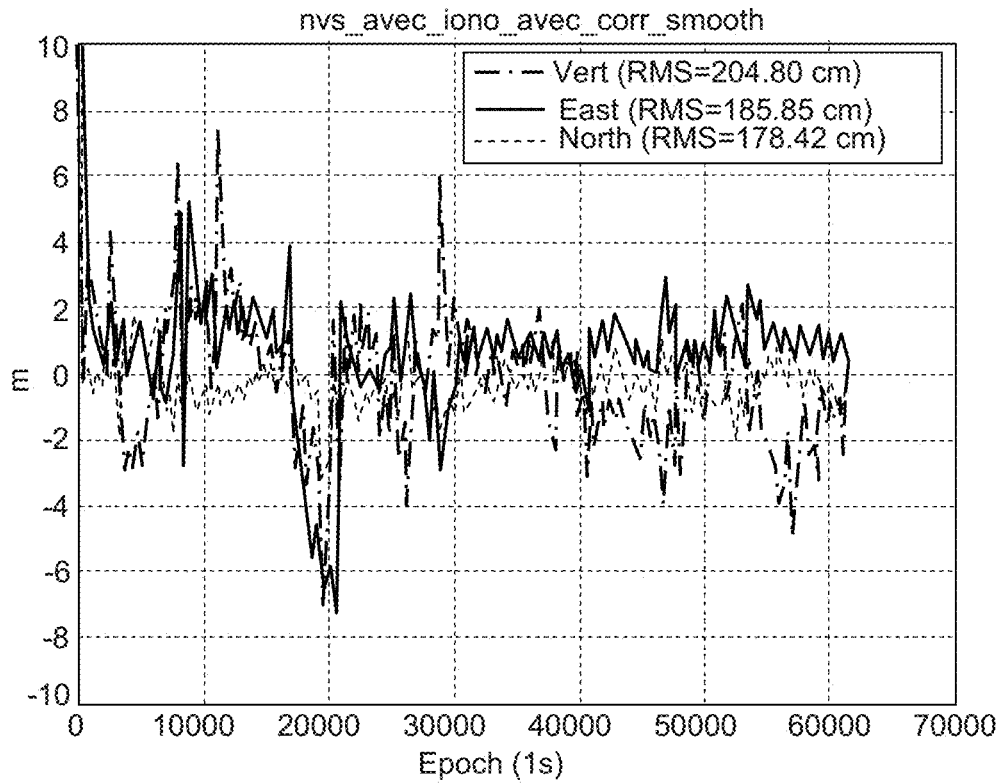

FIGS. 10*a* and 10*b* illustrate the impact of a Doppler smoothing algorithm according to some embodiments of the invention.

Code measurement is in general noisy. This noise is particularly visible in a single-frequency solution, where it is not possible to perform a ionosphere-free solution with the phase measurements only. However, it is possible to smooth these code measurements thanks to the Doppler measurements. The aim of this smoothing is to reduce the noise and not to reduce the bias.

This smoothing is performed independently on each frequency with a filter of order one applied on 2 successive measurements:

$$C_{St} = (1-\alpha)C_t + \alpha\left(C_{S(t-dt)} + dt\frac{D_{t-dt} + D_t}{2}\right)$$

with:
$C_{St}$ Smoothed code measurement (at t)
$C_t$ Raw code measurement (at t)
$C_{s(t-dt)}$ Smoothed code measurement (at t–dt)
$D_t$ Doppler measurement (at t)
$D_{t-dt}$ Doppler measurement (at t–dt)
α Smoothing coefficient (0 not smoothing, 0.95 smoothing).

The α coefficient is directly related to the time constant of the filter by the formula $\alpha=e^{-1/\tau}$, where τ=30 s On FIG. 10*a*, the code measurements are not smoothed, whereas on FIG. 10*b* they are. The three curves on the figures are the RMS (Root Mean Squares) of the measurements along three axes (Vertical, East, North) over time. There is clearly more noise on the curves of FIG. 10*a* than on the curves of FIG. 10*b*.

This improvement of the invention can be applied to receivers with different numbers of frequency bands (1, 2, 3 or even more in the future).

Figure 11A:
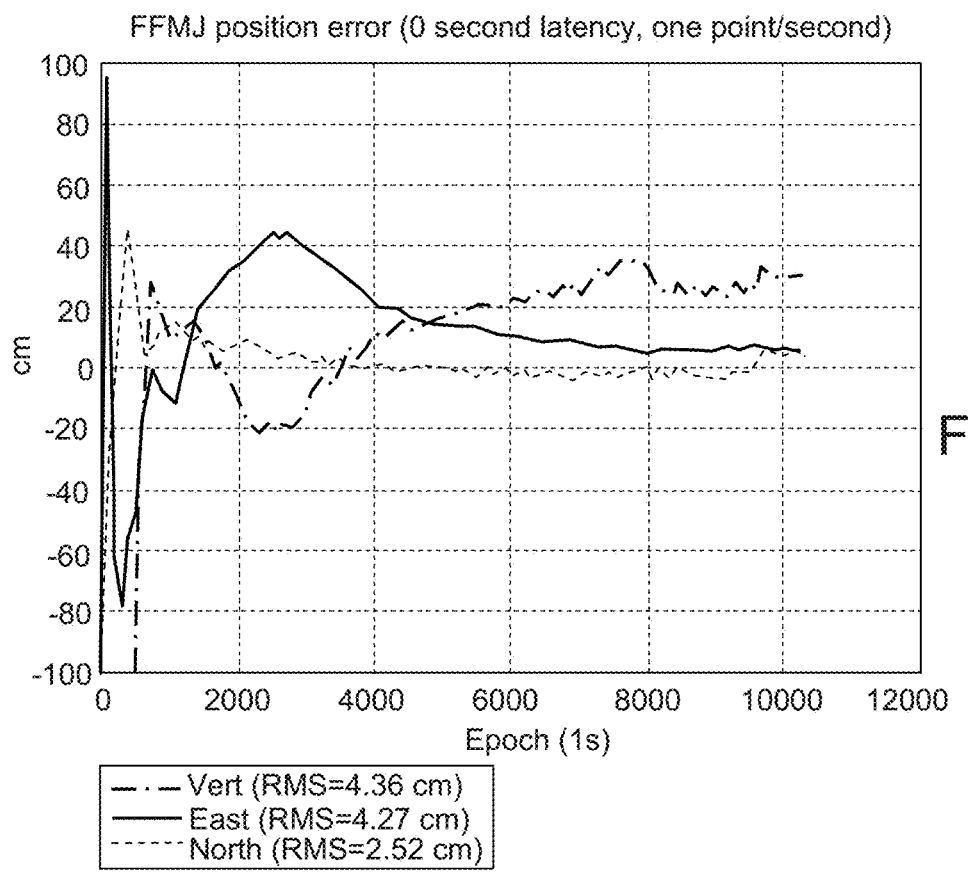
FIGS. 11a, 11b and 11c illustrate the impact on convergence of a triple frequency GNSS receiver of a synchronization of clock corrections and measurements in some embodiments of the invention.
Figure 11B:
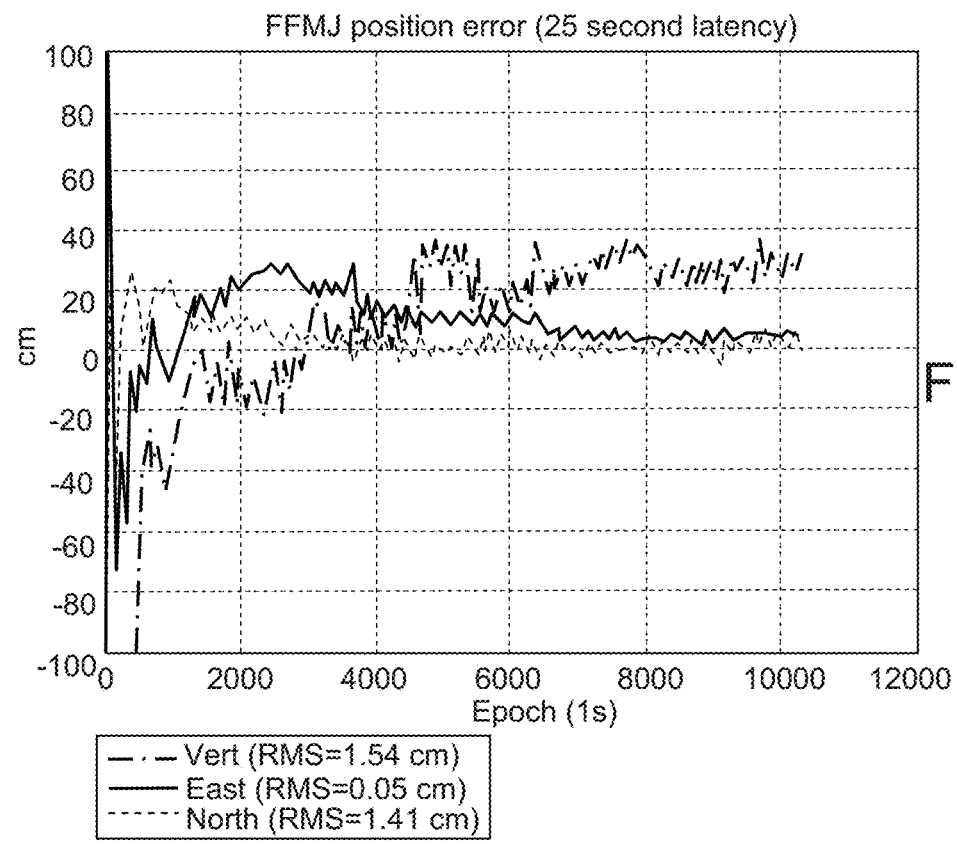
Figure 11C:
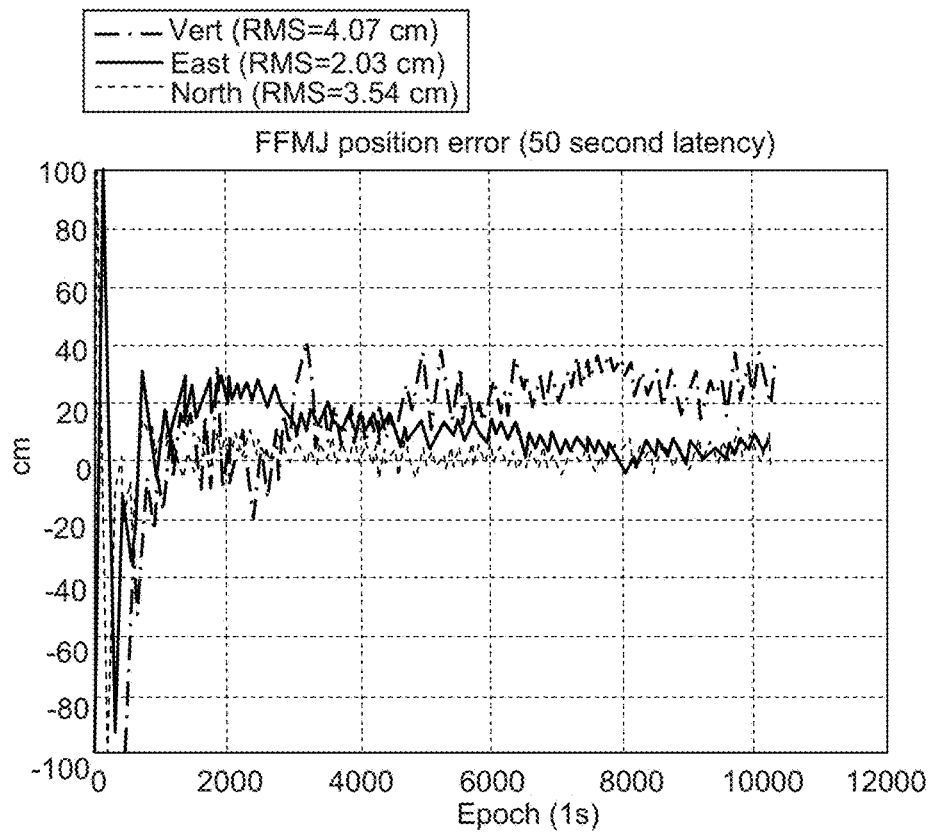

FIGS. 11*a*, 11*b* and 11*c* illustrate the impact on convergence of a triple frequency GNSS receiver of a synchronization of clock corrections and measurements in some embodiments of the invention.

Accurate clock corrections are available within the RTIGS framework. They follow the RTCM convention and are time-tagged. In order to perform a precise positioning, these clocks need to be recent. According to the invention, a new mechanism is implemented to ensure that the delay between the clock corrections and the time of measurements does not exceed a certain threshold (typically 10-20 seconds). This delay can be modified in the settings. It consists in buffering the measurements until the clocks correction are refreshed. This functionality allows reducing the short term noise of the solution.

All measurements displayed on the figures were made at the FFMJ station in Frankfurt (Germany). On each figure, three different curves are displayed, which relate to the position errors in three directions (Vertical, East, North). The curves on FIG. 11*a* relate to a situation where the corrections are fully synchronized with the position measurements (zero latency). On FIG. 11*b*, the curves relate to a situation where the corrections have a latency of 25 s relative to the position measurements. On FIG. 11*b*, the curves relate to a situation where the corrections have a latency of 50 s relative to the position measurements. The increase in the noise of the measurements from FIG. 11*a* to FIG. 11*b* and to FIG. 11*c* is apparent on the figures.

This improvement of the invention can also be applied to receivers with different numbers of frequency bands (1, 2, 3 or even more in the future).

It is important to note that the receiver and the method of the invention are constellation and frequency independent.

For symmetry reasons, there is no preference on a specific constellation or a specific frequency. In a number of embodiments of the invention, the user can for example select to perform a PPP solution on GLONASS only. In addition, this allows the computation of a navigation solution even if less than 4 satellites are in view for each constellation (for example 3 GPS and 2 Glonass).

Another advantage of the invention is that its multi-receivers feature allows to process a whole set of receivers at a time, which is particularly useful for hazard monitoring, where a large number of receivers are positioned in a grid to detect earthquakes.

Thanks to the invention, PPP will be available to users of less complex receivers.

Figure 12:
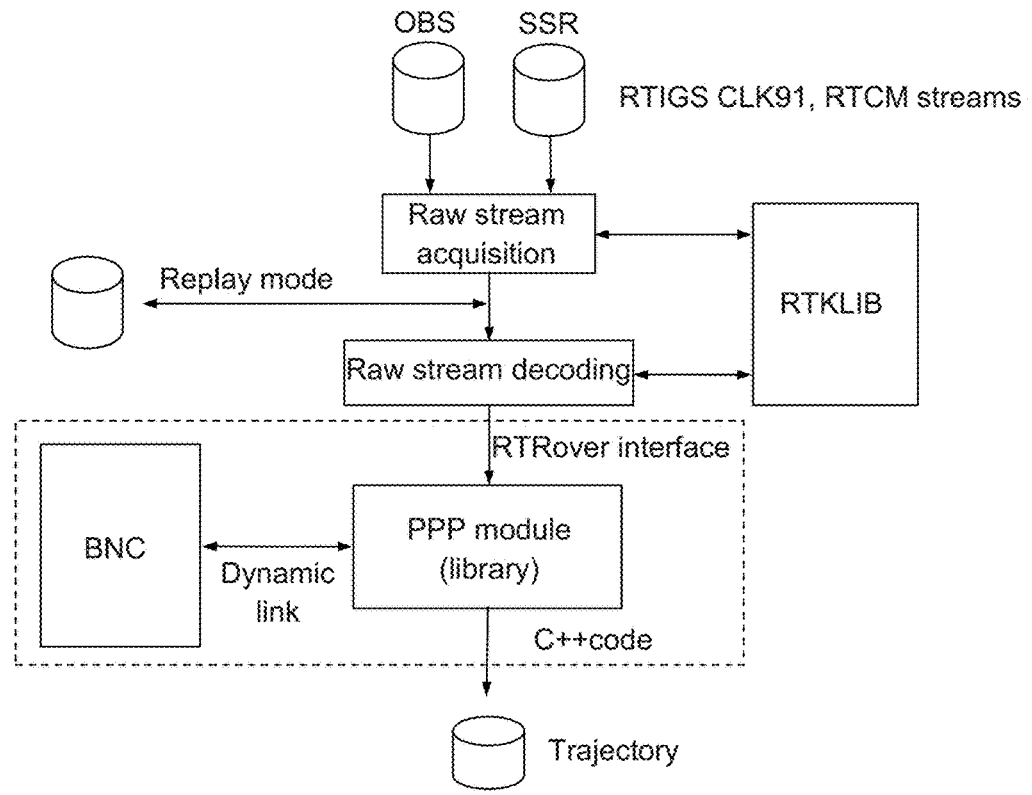
FIG. 12 is a representation of the architecture of an example of a system to implement the invention.

FIG. 12 is a representation of an example of architecture of a system to implement the invention.

The invention may for example be implemented using data procured from a RTIG analysis center, notably including accurate orbits and clocks for GPS and Glonass (Product prefix CLK9x). Such data may use a technique called 'undifferenced ambiguity resolution' (see «Integer Ambiguity Resolution on undifferenced GPS Phase measurements and its application to PPP and satellite precise orbit determination», already cited above). This technique improves the intrinsic quality of clocks for the IGS Real Time Service. The use of these clocks allows ambiguity resolution on any isolated "user" receiver enabling it to achieve 1 cm horizontal precise point positioning accuracy.

The form of the software (PPP-Wizard) of this example of solution is a C++ library. This software is compatible with other available software like BNC (BKG Ntrip Client which was developed for the German Federal Agency for Cartography and Geodesy) or RTKLIB (Real-Time Kinematics LIBraries. Orbit and clocks corrections come mainly from RTCM (real-time streams) but the software is capable of handling SBAS corrections as well. Ambiguity resolution in a triple frequency implementation according to the invention will be a key feature of the software.

In order to be compatible with BNC, the core PPP module is implemented as a library and respects the RTRover interface: this allows linking directly the module with BNC. In addition, this interface can also be fed using RTCM streams of observables and corrections. In this case, the decoding of the streams is performed thanks to the RTKLIB library [RTKLIB]. A separate module using also RTKLIB is in charge of the streams acquisition. In this way, the streams can be directed to the PPP module or stored for further replay.

Figure 13:
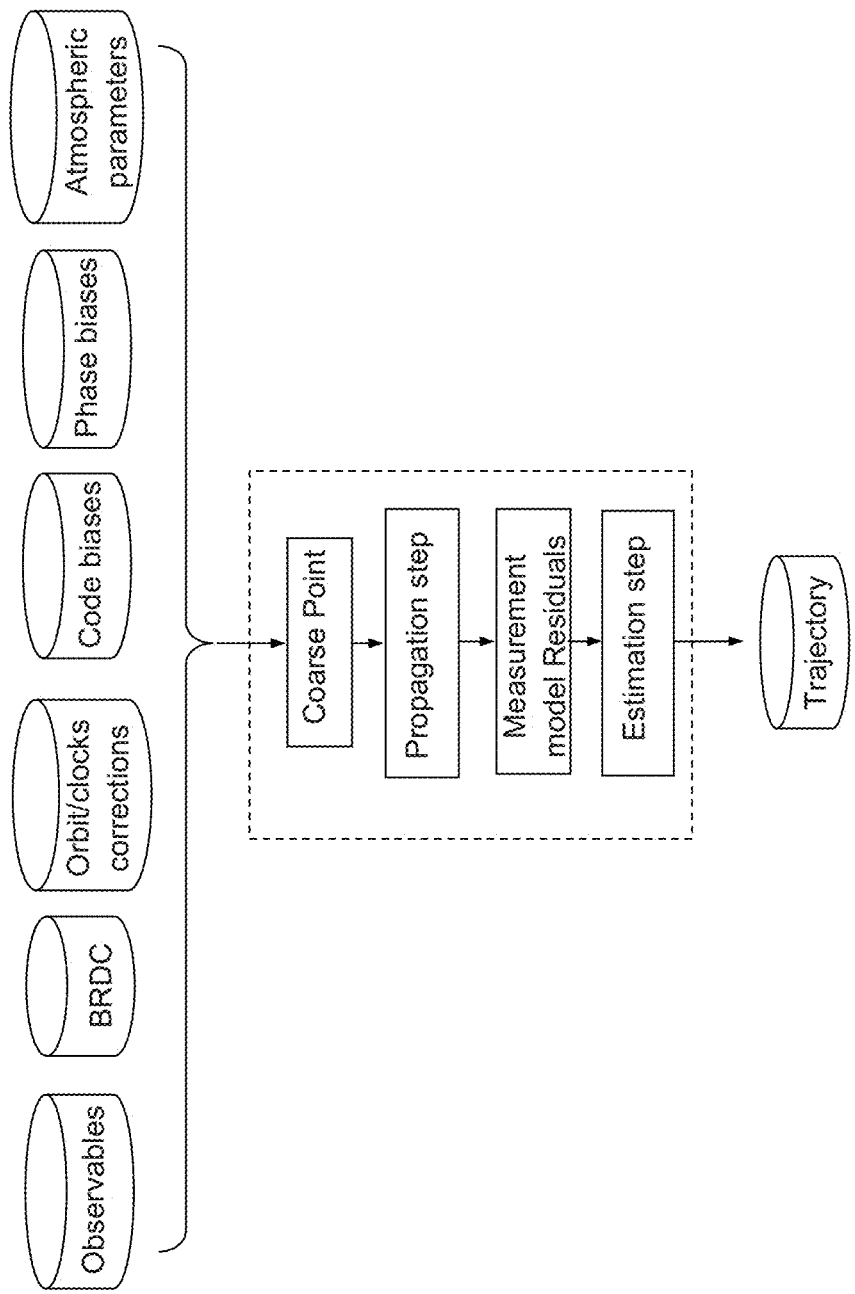
FIG. 13 is a representation of a flow chart of a PPP core module to implement the invention.

FIG. 13 is a representation of a flow chart of a PPP core module to implement the invention.

The RTRover interface allows presenting to the module the different inputs:
Observables
Broadcasts
Corrections
Biases
Atmospheric quantities Then the computation step of the interface is invoked. This step performs the following tasks:
Computation of an initial coarse point
Propagation step of the state vector
Computation of the residuals thanks to the measurement model
Estimation step of the state vector Finally, the computation step outputs the solution. The solution is composed of the receiver's position as well as the troposphere delay and the associated co-variances.

The examples disclosed in this specification are only illustrative of some embodiments of the invention. They do not in any manner limit the scope of said invention which is defined by the appended claims.

The invention claimed is:

1. A receiver of GNSS positioning signals comprising:
N-plets of signal processing channels, each signal processing channel in an N-plet configured to acquire and track positioning signals emitted by a satellite on N different carriers, and comprising tracking circuits configured for tracking code and carrier signals at a given frequency of one of the N carriers, said tracking producing an output comprising values of a propagation distance between the receiver and the satellite at the given frequency;
one or more filtering circuits configured for calculating a predicted pseudo-range value and a predicted phase value for the satellite at the output of an observation model;
wherein N is an integer equal to or higher than two, and said observation model:
receives as input a measurement vector comprising the propagation distance values output of the tracking circuits of the N-plets of signal processing channels and produces its output using a state vector comprising a receiver position value, a receiver clock value, code and phase biases for the receiver, and carrier phase ambiguities, one or more of the carrier phase ambiguities characterizing a combination of carriers selected from the N different carriers; and
does not receive as input measurements sent from a reference receiver, and
wherein the state vector comprises variables representative of the carrier phase ambiguities of a first frequency carrier, a widelane and an extra widelane, and the observation model comprises a bootstrap calculation which solves the ambiguities at each time interval, starting with the extra widelane carrier.

2. The receiver of claim 1, wherein N equals to or is higher than 3 and a carrier phase ambiguity in the state vector characterizes one of the widelane and the extra widelane combination of the N carriers.

3. The receiver of claim 1, wherein the observation model further receives as input corrections of one of a Sagnac effect, a solid earth tide effect, a phase wind-up effect, a ionospheric error, a troposheric error, an orbital error and a relativistic error.

4. The receiver of claim 3, wherein the observations model receives as input corrections of a ionospheric error and a tropospheric error which are modulated by a local meteorological a priori.

5. The receiver of claim 1, wherein the observation model uses as initial position of the receiver an average of pseudo-ranges between the receiver and a number of satellites in view.

6. The receiver of claim 1, wherein the observation model uses a matrix of co-variances which is updated using a Bierman algorithm and which is propagated using a Thornton algorithm.

7. The receiver of claim 1, wherein the measurement vector and the state vector comprise data from a plurality of satellites, at least two in the plurality of satellites belonging to two different constellations.

8. The receiver of claim 1, wherein a measured value at the output of the tracking circuit is filtered out of the measurement vector if its residual to a predicted value is higher than a first predetermined threshold.

9. The receiver of claim 1, wherein measured values at the output of the tracking circuit are kept in the measurement vector if their residuals to predicted values are lower than a second predetermined threshold and their number is maximum, after iterative filtering out of the measurement vector of combinations of said measured values.

10. The receiver of claim 1, wherein the state vector further comprises integer phase carrier jumps, each integer phase carrier jump being used to test an initial value of a carrier phase ambiguity after a loss of signal.

11. The receiver of claim 1, wherein code measurements used in the tracking circuit and the filtering circuit are smoothed in a filter of order one using a Doppler measurement of the carrier modulated by the code measurement.

12. The receiver of claim 1, wherein the observation model takes into account at a time measurements which have a time difference with a clock of the satellite smaller than a preset value.

13. A method of positioning a receiver of GNSS signals comprising:
acquiring N-plets of GNSS signals at signal processing channels, each signal processing channel in an N-plet configured to acquire and track positioning signals emitted by a satellite on N different carriers, and comprising tracking circuits configured for tracking code and carrier signals at a given frequency of one of the N carriers, said tracking producing an output comprising values of a propagation distance between the receiver and the satellite at the given frequency;

calculating at one or more filtering circuits a predicted pseudo-range value and a predicted phase value for the satellite at the output of an observation model;

wherein N is an integer equal to or higher than two, and said observation model:

receives as input a measurement vector comprising the propagation distance values output of the tracking circuits of the N signal processing channels and produces its output using a state vector comprising a receiver position value, a receiver clock value, code and phase biases for the receiver, and carrier phase ambiguities, at least one of the carrier phase ambiguities characterizing a combination of carriers selected from the N different carriers; and does not receive as input measurements sent from a reference receiver, and wherein the state vector comprises variables representative of the carrier phase ambiguities of a first frequency carrier, a widelane and an extra widelane, and the observation model comprises a bootstrap calculation which solves the ambiguities at each time interval, starting with the extra widelane carrier.

14. A computer program for positioning a receiver of GNSS signals comprising computing instructions stored on a non-transitory computer storage medium to be executed by one or more processor for:

acquiring N-plets of GNSS signals at N-plets of signal processing channels, each signal processing channel in the N-plet configured to acquire and track positioning signals emitted by a satellite on N different carriers, and comprising tracking circuits configured for tracking code and carrier signals at a given frequency of one of the N carriers, said tracking producing an output comprising values of a propagation distance between the receiver and the satellite at the given frequency;

calculating at one or more filtering circuits a predicted pseudo-range value and a predicted phase value for the satellite at the output of an observation model;

wherein N is an integer equal to or higher than two, and said observation model:

receives as input a measurement vector comprising the propagation distance values output of the tracking circuits of the N-plets of signal processing channels and produces its output using a state vector comprising a receiver position value, a receiver clock value, code and phase biases for the receiver, and carrier phase ambiguities, at least one of the carrier phase ambiguities characterizing a combination of carriers selected from the N different carriers and does not receive as input measurements sent from a reference receiver, and wherein the state vector comprises variables representative of the carrier phase ambiguities of a first frequency carrier, a widelane and an extra widelane, and the observation model comprises a bootstrap calculation which solves the ambiguities at each time interval, starting with the extra widelane carrier.

\* \* \* \* \*